(12) United States Patent
Vijayasankar et al.

(10) Patent No.: US 10,637,534 B2
(45) Date of Patent: Apr. 28, 2020

(54) COEXISTENCE PRIMITIVES IN POWER LINE COMMUNICATION NETWORKS

(71) Applicant: Texas Instruments Incorporated, Dallas, TX (US)

(72) Inventors: Kumaran Vijayasankar, Allen, TX (US); Ramanuja Vedantham, Allen, TX (US); Tarkesh Pande, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 81 days.

(21) Appl. No.: 14/985,898

(22) Filed: Dec. 31, 2015

(65) Prior Publication Data

US 2016/0119028 A1 Apr. 28, 2016

Related U.S. Application Data

(63) Continuation of application No. 13/923,097, filed on Jun. 20, 2013, now Pat. No. 9,231,658.

(60) Provisional application No. 61/662,176, filed on Jun. 20, 2012.

(51) Int. Cl.
*H04L 12/413* (2006.01)
*H04B 3/54* (2006.01)

(52) U.S. Cl.
CPC ........... *H04B 3/544* (2013.01); *H04L 12/413* (2013.01); *H04B 2203/5408* (2013.01); *H04B 2203/5433* (2013.01); *H04B 2203/5445* (2013.01)

(58) Field of Classification Search
None
See application file for complete search history.

(56) References Cited

U.S. PATENT DOCUMENTS

| | | | | |
|---|---|---|---|---|
| 9,231,658 | B2 * | 1/2016 | Vijayasankar | H04B 3/544 |
| 2005/0185629 | A1 * | 8/2005 | Kuroda | H04L 69/324 |
| | | | | 370/347 |
| 2009/0016379 | A1 * | 1/2009 | Takagi | H04L 12/413 |
| | | | | 370/474 |
| 2010/0272192 | A1 * | 10/2010 | Varadarajan | H04L 27/2613 |
| | | | | 375/257 |
| 2011/0255557 | A1 * | 10/2011 | Varadarajan | H04B 1/69 |
| | | | | 370/474 |
| 2011/0267956 | A1 * | 11/2011 | Yonge, III | H04L 12/413 |
| | | | | 370/241 |
| 2012/0051361 | A1 * | 3/2012 | O'Mahony | H04B 3/542 |
| | | | | 370/392 |
| 2013/0016792 | A1 * | 1/2013 | Yonge, III | H04B 7/2656 |
| | | | | 375/257 |

(Continued)

*Primary Examiner* — Kodzovi Acolatse
(74) *Attorney, Agent, or Firm* — Brian D. Graham; Charles A. Brill; Frank D. Cimino

(57) ABSTRACT

Systems and methods for setting a carrier-sensing mechanism in a PLC node are disclosed. In a PLC standard, coexistence is achieved by having the nodes detect a common preamble and backing off by a Coexistence InterFrame Space (cEIFS) time period to help the node to avoid interfering with the other technologies. In one embodiment, a PHY primitive is sent from the PHY to the MAC know that there has been a preamble detection. A two-level indication may be used—one indication after receiving the preamble and other indication after decoding the entire frame. The MAC sets the carrier-sensing mechanism based on the preamble detection.

16 Claims, 5 Drawing Sheets

(56) References Cited

U.S. PATENT DOCUMENTS

| | | | | |
|---|---|---|---|---|
| 2013/0121425 A1* | 5/2013 | Pande | ...................... | H04B 3/54 375/257 |
| 2014/0233478 A1* | 8/2014 | Wentink | ................ | H04L 5/0055 370/329 |
| 2015/0071204 A1* | 3/2015 | Seok | .................... | H04B 7/0452 370/329 |

\* cited by examiner

COEXISTENCE PRIMITIVES IN POWER LINE COMMUNICATION NETWORKS

CROSS-REFERENCE TO RELATED APPLICATIONS

This application is a Continuation of and claims benefit of U.S. patent application Ser. No. 13/923,097 filed Jun. 20, 2013, which claims the benefit of the filing date of U.S. Provisional Patent Application No. 61/662,176, which is titled "Primitives to Solve the NAV Updation for Coexistence Mechanisms" and was filed on Jun. 20, 2012, the disclosure of which is hereby incorporated by reference herein in its entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, and appliance and lighting control.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

Using PLC to communicate with utility meters enables applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC has conducted emissions requirements that start at 535 kHz and therefore the PLC systems have an FCC band defined from 154-487.5 kHz using 72 tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

Different PLC technologies may share the same PLC network and may operate in the same frequency range. Transmissions by nodes using different technologies may interfere with each other if the nodes do not recognize when other technologies are using the channel. A preamble-based coexistence mechanism can be used by different types of PLC technologies to fairly share the medium. Coexistence provides the ability for different narrow-band power line technologies to share the same power line medium and to function simultaneously with an acceptable level of performance. For example, a preamble-based Carrier Sense Multiple Access (CSMA) can be used where different technologies have overlapping band plans.

SUMMARY OF THE INVENTION

Embodiments of the invention include systems and methods for setting a Network Allocation Vector (NAV) in a PLC node. In a PLC standard, such as IEEE P1901.2/ITU, coexistence is achieved by having the nodes detect a common preamble and backing off by a Coexistence InterFrame Space (cEIFS) time period to help the node to avoid interfering with the other technologies. However, in existing systems, no mechanism has been defined to allow a node to know when to set its NAV to perform the cEIFS back-off.

In one embodiment, an additional PHY primitive is added to let the MAC know that there has been a preamble detection. Traditionally, the PHY provides an indication only after the complete reception of a frame. A two-level indication may be used—one indication after receiving the preamble and other indication after decoding the entire frame.

A PD-PREAMBLE.Indication primitive is generated by the PHY after receiving the complete preamble. The primitive has the format:

PD-PREAMBLE-Indication
{
PT
} wherein the value of PT (Preamble Type) is set to 0 if a node's native preamble is detected, and set to 1 if only a coexistence preamble is detected (i.e., the node was unable to detect a foreign preamble generated by another technology node).

The receiver MAC responds to the new primitive as follows:

MAC sets its NAV to cEIFS on detecting a foreign preamble (i.e., detecting only the coexistence preamble); and MAC sets its NAV to EIFS on detecting a native preamble in addition to the coexistence preamble.

BRIEF DESCRIPTION OF THE DRAWINGS

Figure 1:
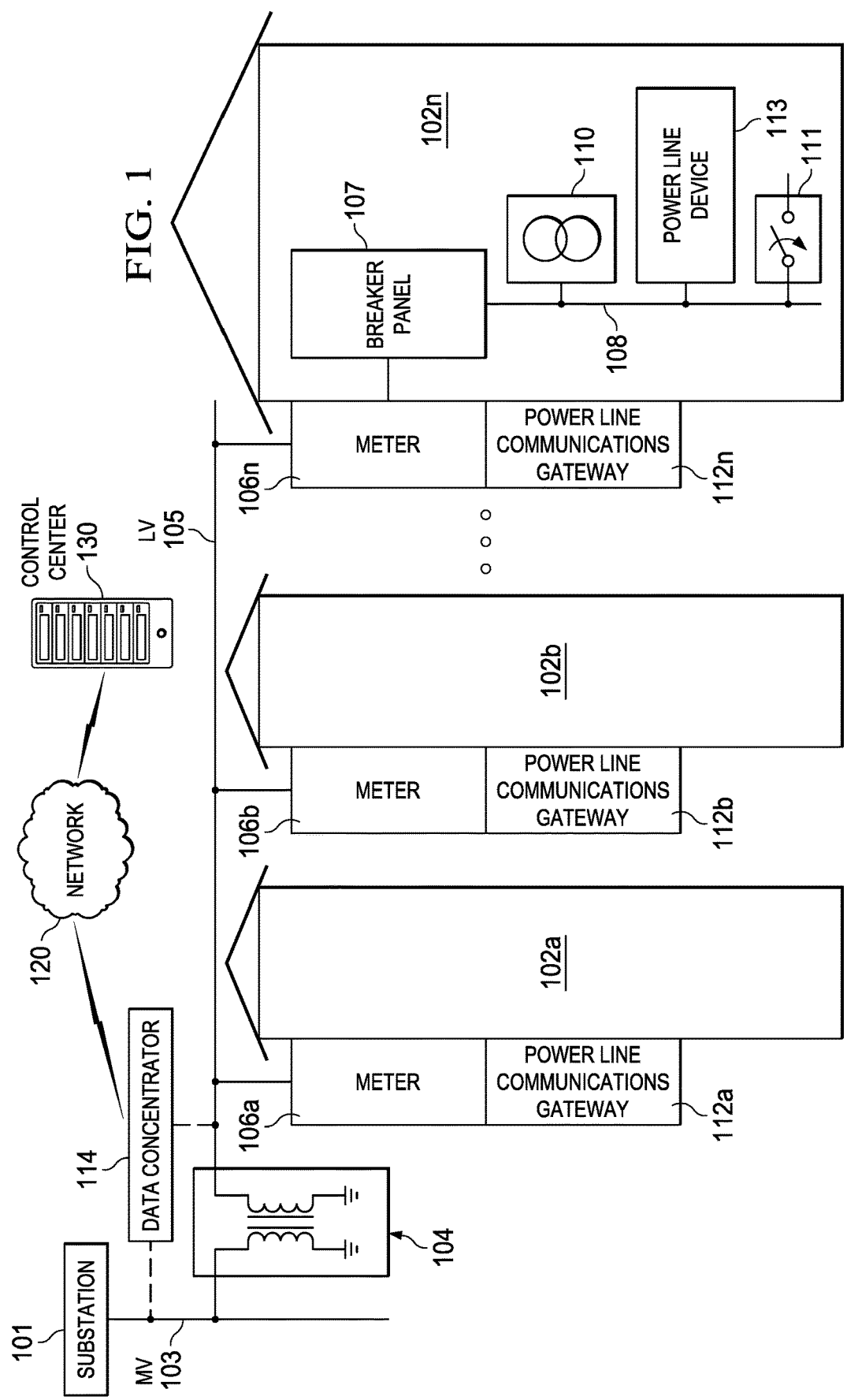

Having thus described the invention in general terms, reference will now be made to the accompanying drawings, wherein:

FIG. 1 is a diagram of a PLC system according to some embodiments.

Figure 2:
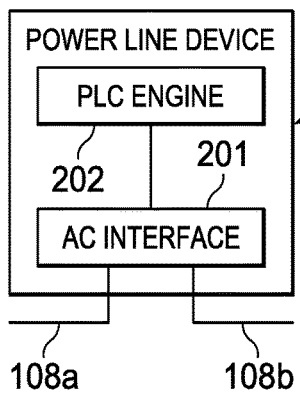

FIG. 2 is a block diagram of a PLC device or modem according to some embodiments.

Figure 3:
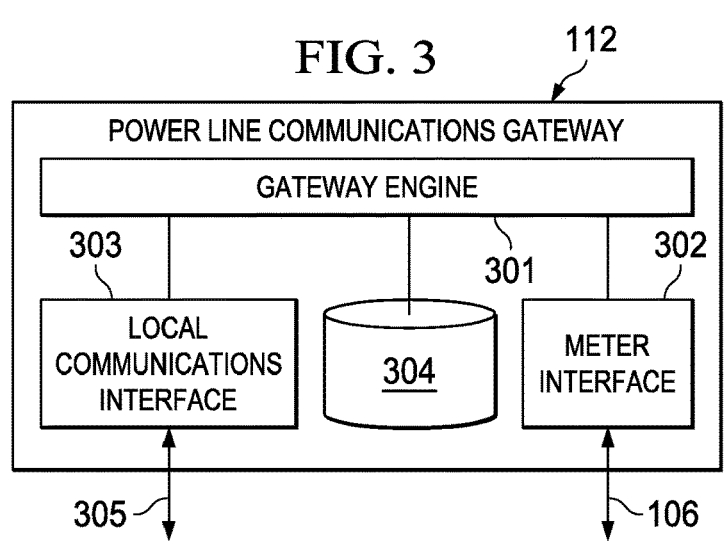

FIG. 3 is a block diagram of a PLC gateway according to some embodiments.

Figure 4:
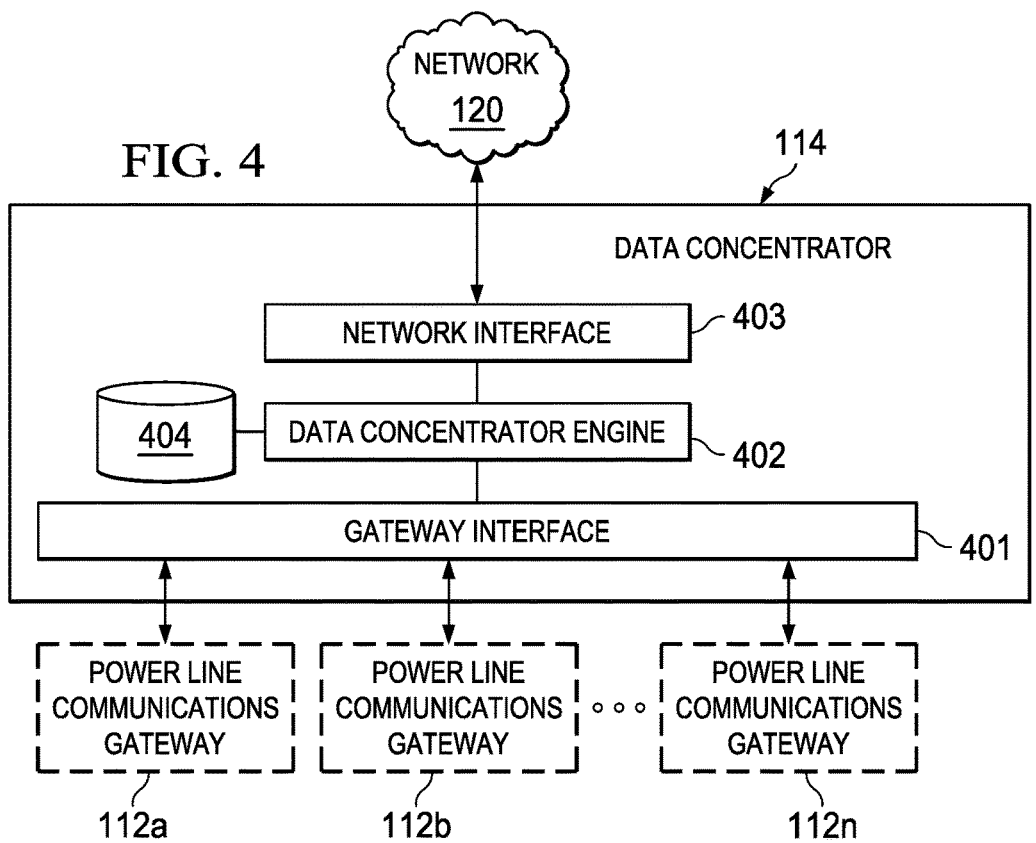

FIG. 4 is a block diagram of a PLC data concentrator according to some embodiments.

Figure 5:
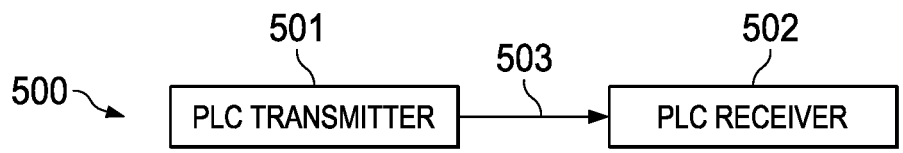

FIG. 5 is a schematic block diagram illustrating one embodiment of a system configured for point-to-point PLC.

Figure 6:
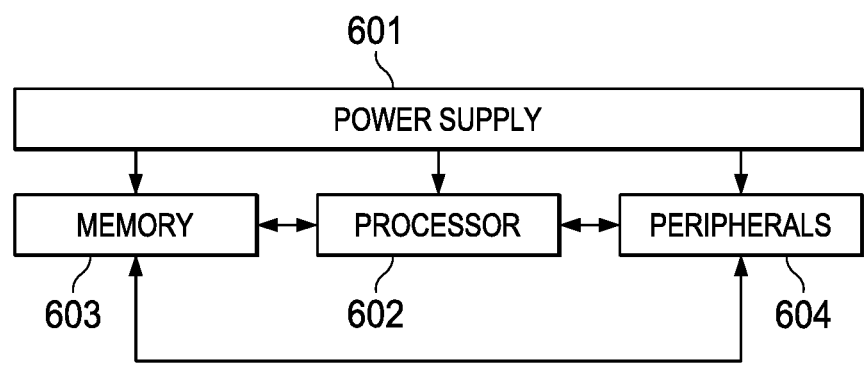

FIG. 6 is a block diagram of an integrated circuit according to some embodiments.

Figure 7:
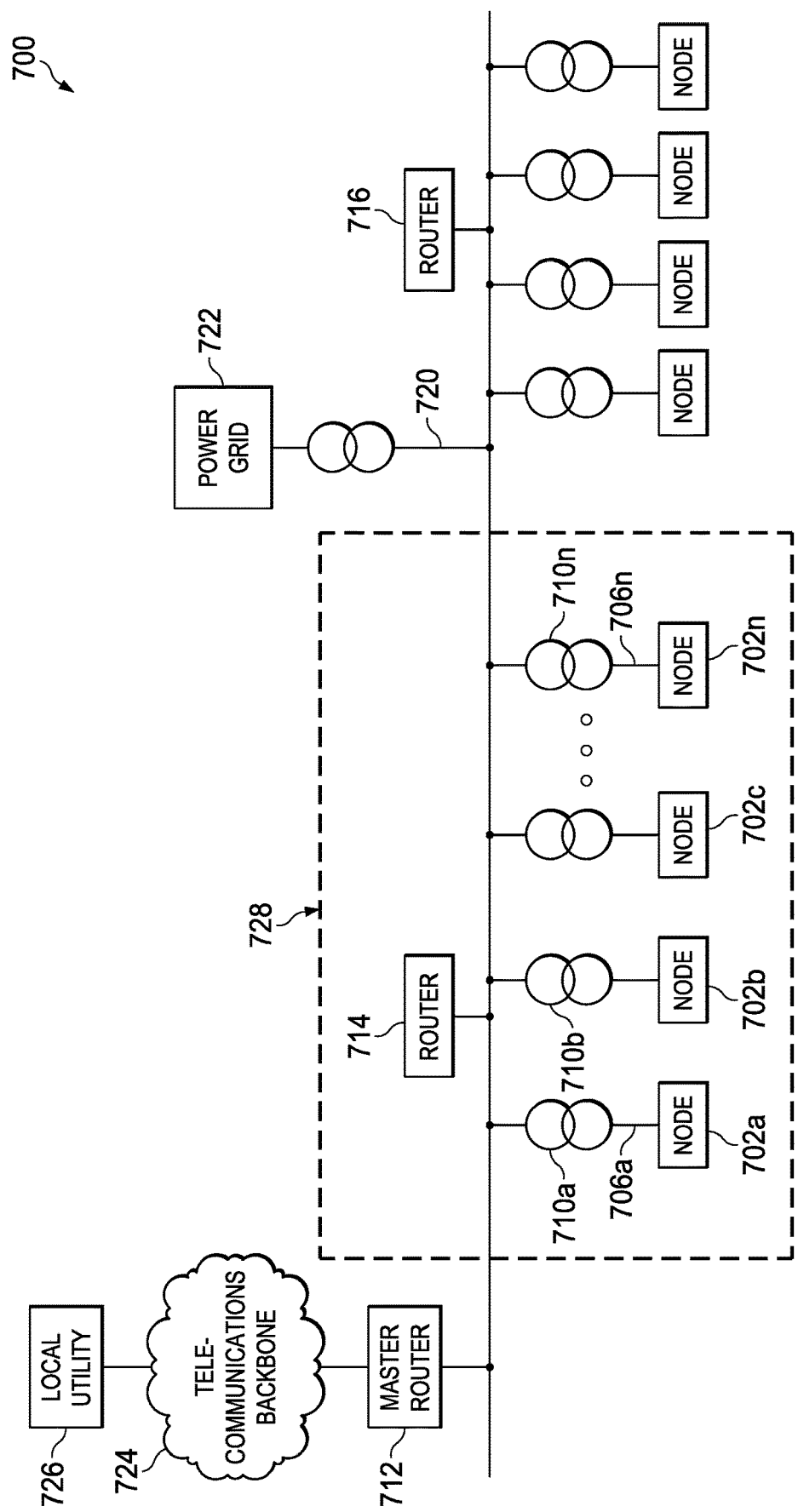

FIG. 7 illustrates an example embodiment of a PLC network for a local utility PLC communications system.

Figure 8:
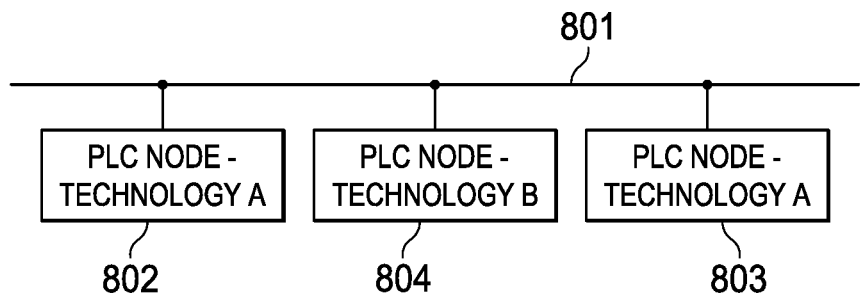

FIG. 8 illustrates one embodiment of a system in which devices of different standards or protocols (e.g., technology A and technology B) may operate together in coexistence on a wire in a PLC network.

Figure 9:
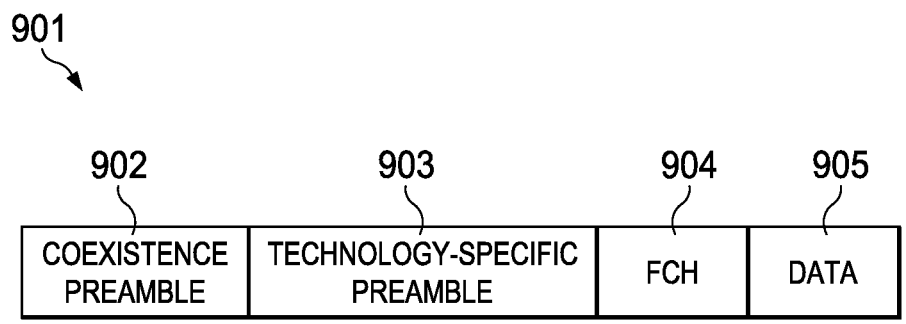

FIG. 9 illustrates one embodiment of a data packet that may be communicated between the devices.

Figure 10:
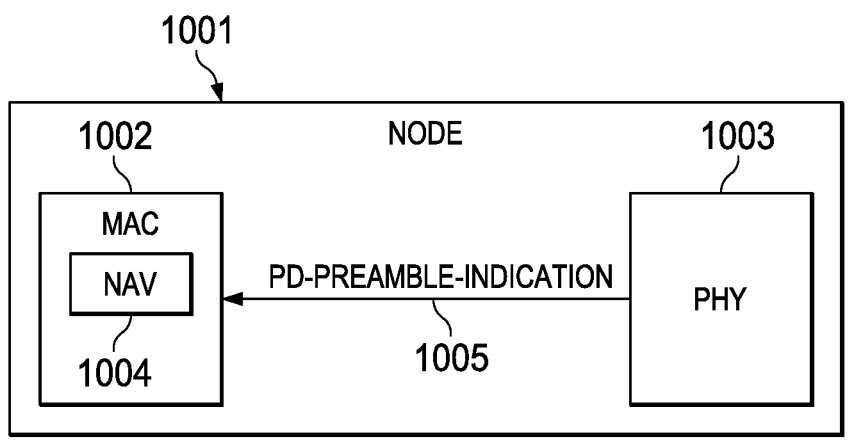

FIG. 10 is a block diagram illustrating a node sending a preamble indication primitive to a MAC layer from a PHY.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a power line communication network according to some embodiments. Medium voltage (MV) power lines 103 from subnode 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters or nodes 106*a-n*, which are typically mounted on the outside of residences 102*a-n*. Although referred to as "residences," premises 102*a-n* may include any type of building, facility, electric vehicle charging node, or other location where electric power is received and/or consumed. A breaker panel, such as panel 107, provides an interface between meter 106*n* and electrical wires 108 within residence 102*n*. Electrical wires 108 deliver power to outlets 110, switches 111 and other electric devices within residence 102*n*.

The power line topology illustrated in FIG. 1 may be used to deliver high-speed communications to residences 102*a-n*. In some implementations, power line communications modems or gateways 112*a-n* may be coupled to LV power lines 105 at meter 106*a-n*. PLC modems/gateways 112*a-n* may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102*a-n*. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, G3-PLC standard.

PLC modems or gateways 112*a-n* at residences 102*a-n* use the MV/LV power grid to carry data signals to and from PLC data concentrator or router 114 without requiring additional wiring. Data concentrator or router 114 may be coupled to either MV line 103 or LV line 105. Modems or gateways 112*a-n* may support applications such as high-speed broadband Internet links, narrowband control applications, low bandwidth data collection applications, or the like. In a home environment, for example, modems or gateways 112*a-n* may further enable home and building automation in heat and air conditioning, lighting, and security. Also, PLC modems or gateways 112*a-n* may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108*a* and 108*b* inside of premises 112*n* in a manner that allows PLC device 113 to switch the connection between wires 108*a* and 108*b* off using a switching circuit or the like. In other embodiments, however, AC interface 201 may be connected to a single wire 108 (i.e., without breaking wire 108 into wires 108*a* and 108*b*) and without providing such switching capabilities. In operation, AC interface 201 may allow PLC engine 202 to receive and transmit PLC signals over wires 108*a-b*. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112*n* (e.g., street lighting, etc.).

PLC engine 202 may be configured to transmit and/or receive PLC signals over wires 108*a* and/or 108*b* via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108*a*, and/or 108*b*. PLC engine 202 may receive such power consumption information, encode it as one or more PLC signals, and transmit it over wires 108, 108*a*, and/or 108*b* to higher-level PLC devices (e.g., PLC gateways 112*n*, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZigBee, Bluetooth, Wi-Fi, Wi-Max, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 305 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

FIG. 5 is a schematic block diagram illustrating one embodiment of a system 500 configured for point-to-point PLC. The system 500 may include a PLC transmitter 501 and a PLC receiver 502. For example, a PLC gateway 112 may be configured as the PLC transmitter 501 and a PLC device 113 may be configured as the PLC receiver 502. Alternatively, the PLC device 113 may be configured as the PLC transmitter 501 and the PLC gateway 112 may be configured as the PLC receiver 502. In still a further embodiment, the data concentrator 114 may be configured as either the PLC transmitter 501 or the PLC receiver 502 and configured in combination with a PLC gateway 112 or a PLC device 113 in a point-to-point system 500. In still a further embodiment, a plurality of PLC devices 113 may be configured to communicate directly in a point-to-point PLC system 500 as described in FIG. 5. Additionally, the subnode 101 may be configured in a point-to-point system 500 as described above. One of ordinary skill in the art will recognize a variety of suitable configurations for the point-to-point PLC system 500 described in FIG. 5.

FIG. 6 is a block diagram of a circuit for implementing the transmission of multiple beacon frames using different modulation techniques on each tone mask in a PLC network according to some embodiments. In some cases, one or more of the devices and/or apparatuses shown in FIGS. 1-5 may be implemented as shown in FIG. 6. In some embodiments, processor 602 may be a digital signal processor (DSP), an application specific integrated circuit (ASIC), a system-on-chip (SoC) circuit, a field-programmable gate array (FPGA), a microprocessor, a microcontroller, or the like. Processor 602 is coupled to one or more peripherals 604 and external memory 603. In some cases, external memory 603 may be used to store and/or maintain databases 304 and/or 404 shown in FIGS. 3 and 4. Further, processor 602 may include a driver for communicating signals to external memory 603 and another driver for communicating signals to peripherals 604. Power supply 601 provides supply voltages to processor 602 as well as one or more supply voltages to memory 603 and/or peripherals 604. In some embodiments, more than one instance of processor 602 may be included (and more than one external memory 603 may be included as well).

Peripherals 604 may include any desired circuitry, depending on the type of PLC system. For example, in an embodiment, peripherals 604 may implement local communication interface 303 and include devices for various types of wireless communication, such as Wi-Fi, ZigBee, Bluetooth, cellular, global positioning system, etc. Peripherals 604 may also include additional storage, including RAM storage, solid-state storage, or disk storage. In some cases, peripherals 604 may include user interface devices such as a display screen, including touch display screens or multi-touch display screens, keyboard or other input devices, microphones, speakers, etc.

External memory 603 may include any type of memory. For example, external memory 603 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 603 may include one or more memory modules to which the memory devices are mounted, such as single inline memory modules (SIMMs), dual inline memory modules (DIMMs), etc.

FIG. 7 illustrates an example embodiment of a PLC network 700 for a local utility PLC communications system. Network 700 includes LV nodes 702a-n and each of the nodes 702a-n is connected to MV power line 720 through a corresponding transformer 710a-n and LV line 706a-n. Router, or modem, 714 is also connected to MV power line 720. A sub-network 728, or neighborhood 728, may be represented by the combination of nodes 702a-n and router 714. Master router 712 and router 716 are also connected to MV line 720, which is powered by power grid 722. Power grid 722 represents the high voltage power distribution system.

Master router 712 may be the gateway to telecommunications backbone 724 and local utility, or control center, 726.

Master router 712 may transmit data collected by the routers to the local utility 726 and may also broadcast commands from local utility 726 to the rest of the network. The commands from local utility 726 may require data collection at prescribed times, changes to communication protocols, and other software or communication updates.

During UL communications, the nodes 702a-n in neighborhood 728 may transmit usage and load information ("data") through their respective transformer 710a-n to the MV router 714. In turn, router 714 forwards this data to master router 712, which sends the data to the utility company 726 over the telecommunications backbone 724. During DL communications (router 714 to nodes 702a-n) requests for data uploading or commands to perform other tasks are transmitted.

In accordance with various embodiments, nodes 702a-n employ a Carrier Sense Multiple Access with Collision Avoidance (CSMA/CA) mechanism that combines energy detection and preamble detection to access the PLC network. The nodes may do either of the following CSMA/CA methods to access the channel: (1) run energy detection first and then use preamble detection only after energy detection returns positive, or (2) run both energy detection and preamble detection simultaneously. The CSMA-CA algorithm is used before the transmission of data or MAC command frames.

FIG. 8 illustrates one embodiment of a system in which devices of different standards or protocols (e.g., technology A and technology B) may operate together in coexistence on a wire 801 in a PLC network. In this example, the system may include PCL devices 802, 803 that use technology A to communicate. In addition, the system may include another PLC 804 that uses technology B to communicate with other nodes (not shown). For example, devices 802, 803 may use an IEEE P1901.2 technology, and device 804 may use an ITU-G3 technology. Devices using different technologies may coexist in the same PLC system using a coexistence preamble.

FIG. 9 illustrates one embodiment of a data packet 901 that may be communicated between the devices 802 and 803 of FIG. 8. In one embedment, the data packet 901 may include a coexistence preamble 902, a technology-specific preamble 903, a frame control header (FCH) 904, and a data payload 905. When a device listens to the PLC medium to access the channel for communication, it may detect preambles 902, 903 on the channel. Coexistence preamble 902 comprises a sequence of symbols that are agreed upon across different technologies (i.e., it will be detected by both technologies A and B). Technology-specific preamble 903 is associated with a particular technology (i.e., it will be detected by only one of technology A or B).

When a device listens on the PLC channel, it will attempt to decode any received data. For example, when data packet 901 is received, the receiving device (e.g., node 802) will detect coexistence preamble 902. If packet 901 was sent by a transmitter using the same technology (e.g., node 803), then the receiving device will also detect the technology-specific preamble 903 as a "native" preamble. The receiving device will further detect and decode the information in FCH 904 and 905. On the other hand, if packet 901 was sent by a transmitter using a different technology (e.g., node 804), then the receiving device will not detect the technology-specific preamble 903 because it is a "foreign" preamble. In this case, the foreign preamble 903—along with FCH 904 and data payload 905—would appear to the receiving device as noise and would not be detected.

When one technology is used on the PLC network, the nodes may use an Extended InterFrame Space (EIFS) that is specifically defined for that technology. In PLC networks where there are devices with different technologies, a common back-off time for all devices in the network referred to as coexistence Extended InterFrame Space (cEIFS) may be defined. A device will back-off for cEIFS if it detects a coexistence preamble 902 on the channel. This enables fair channel access for different technologies in a coexistence system regardless of the number of devices exist on the system for each technology.

In one embodiment, a coexistence preamble sequence may consist ofM repeated symbols, such as repeated SyncP format symbols. Alternatively, a new SyncC symbol may be defined specifically for coexistence. The value M may be chosen such that the coexistence sequence 902 is as large as the maximum packet size supported by all the technologies competing for channel access present in the network. In some embodiments the SyncP or SyncC symbol may be defined as an OFDM symbol with selected subcarriers modulated with phase values between (0-2π). In other embodiments, the SyncP or SyncC symbols may consist of chirp sequences, pseudo-random bit sequences, barker sequences, or an arbitrary +/−1 sequence.

When a device detects a coexistence preamble on the channel, it will back-off the channel to allow the transmitting node to complete the transmission. The duration of the back-off interval is set in a Network Allocation Vector (NAV). As a condition to accessing the medium, the MAC layer on a node checks the value of NAV, which is a counter that represents the amount of time before an attempt can be made to send a frame. The NAV must be zero before a node can attempt to send a frame.

Coexistence is achieved by having the nodes detect a common preamble and backing off by a cEIFS (Coexistence EIFS time period) to help avoid it interfering with the other technologies. However, no mechanism has been defined to allow a node to know when to set its NAV to perform the same.

FIG. 10 is a block diagram illustrating a node 1001 having a MAC layer 1002 and a PHY 1003. MAC 1002 is a sublayer of a data link layer that formats data to be communicated over the associated PHY layer. PHY 1003 provides an interface between the MAC sublayer and the physical medium or power line. MAC 1002 includes NAV 1004, which is used to manage the back-off duration between attempts to access the channel.

In one embodiment, a PHY primitive—PD-Preamble-Indication 1005—is used to let MAC 1002 know when PHY 1003 has detected a preamble on the channel. PD-Preamble-Indication 1005 may be a two-level indication that provides one indication after receiving the preamble and another indication after decoding the entire frame.

The PD-Preamble-Indication 1005 may be generated by PHY 1003 after receiving the complete preamble and may be in the following format:

---

PD-Preamble-Indication
{
Preamble Type (PT)
}

--- wherein PT is set to 0 when a native preamble is detected, and is set to 1 when a non-native (or alien or foreign) preamble is detected.

Upon receiving the PD-Preamble-Indication 1005, the MAC 1002 operates as follows:

set NAV 1004 to cEIFS if a non-native preamble is detected (i.e., PT=1); and set NAV 1004 to EIFS if a native preamble is detected (i.e., PT=0).

A native preamble will be detected, if present, by the PHY after detecting the coexistence preamble. The presence of a non-native preamble may be detected by the PHY by the absence of a native preamble following a coexistence preamble. The non-native preamble will look like noise to the PHY because it is not defined for the technology used by the PHY.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

What is claimed is:

1. A method, comprising:
performing by a power line communication (PLC) device of a first PLC communication standard type:
detecting a coexistence preamble on a PLC channel, wherein the co-existence preamble includes a sequence of symbols that is detectable by both PLC devices of the first PLC communication standard type and PLC devices of a second PLC communication standard type that is different from the first PLC communication standard type;
configuring a preamble indication primitive in a first format if a native preamble for the first PLC communication standard type is detected in addition to the coexistence preamble, wherein the native preamble for the first PLC communication standard type is detectable by PLC devices of the first PLC communication standard type but not by PLC devices of the second PLC communication standard type;
configuring the preamble indication primitive in a second format if the native preamble for the first PLC communication standard type is not detected in addition to the coexistence preamble;
setting a carrier-sensing mechanism based upon the preamble indication primitive; and
sending the preamble indication primitive from a PHY layer to a MAC layer on the PLC device.

2. The method of claim 1, further comprising:
setting the carrier-sensing mechanism to a first interframe spacing value if the native preamble for the first PLC communication standard type is detected in addition to the coexistence preamble; and
setting the carrier-sensing mechanism to a second interframe spacing value if the native preamble for the first PLC communication standard type is not detected in addition to the coexistence preamble.

3. The method of claim 1, further comprising:
setting the carrier-sensing mechanism to a native extended interframe spacing (EIFS) value for the first PLC communication standard type, if the native preamble for the first PLC communication standard type is detected in addition to the coexistence preamble; and
setting the carrier-sensing mechanism to a coexistence extended interframe spacing (cEIFS), if the native preamble for the first PLC communication standard type is not detected in addition to the coexistence preamble.

4. The method of claim 1, wherein the coexistence preamble comprises an integer number of repeated symbols agreed upon between the first PLC communication standard type and the second PLC communication standard.

5. The method of claim 4, wherein the repeated symbols include OFDM symbols.

6. The method of claim 4, wherein the repeated symbols include one or more of a chirp sequence, a pseudo-random bit sequence, a barker sequence, and an arbitrary +1/−1 sequence.

7. A power line communication (PLC) device of a first PLC communication standard type comprising:
a receiver configured to monitor a power line communication (PLC) channel of a PLC network and to perform a preamble detection operation on the PLC channel;
a medium access control (MAC) layer adapted to receive a preamble indication primitive from the PHY layer;
a carrier-sensing mechanism adapted to be set by the MAC layer based upon the preamble indication primitive; and
a physical (PHY) layer adapted to configure a preamble indication primitive, the preamble indication primitive being configured in a first format if a native preamble for the first PLC communication standard type is detected by the receiver in addition to a coexistence preamble, and the preamble indication primitive being configured in a second format if the native preamble for the first PLC communication standard type is not detected in addition to the coexistence preamble;
wherein the co-existence preamble includes a sequence of symbols that is detectable by both PLC devices of the first PLC communication standard type and PLC devices of a second PLC communication standard type that is different from the first PLC communication standard type; and
wherein the native preamble for the first PLC communication standard type is detectable by PLC devices of the first PLC communication standard type but not by PLC devices of the second PLC communication standard type.

8. The PLC device of claim 7, wherein:
the carrier-sensing mechanism is set to a first interframe spacing value if the native preamble for the first PLC communication standard type is detected in addition to the coexistence preamble; and
the carrier-sensing mechanism is set to a second interframe spacing value if the native preamble for the first PLC communication standard type is not detected in addition to the coexistence preamble.

9. The PLC device of claim 7, wherein:
the carrier-sensing mechanism is set to a native extended interframe spacing (EIFS) value if the native preamble for the first PLC communication standard type is detected in addition to the coexistence preamble; and
the carrier-sensing mechanism is set to a coexistence extended interframe spacing (cEIFS) if the native preamble for the first PLC communication standard type is not detected in addition to the coexistence preamble.

10. The PLC device of claim 7, wherein the coexistence preamble comprises an integer number of repeated symbols agreed upon between the first PLC communication standard type and the second PLC communication standard.

11. The PLC device of claim 10, wherein the repeated symbols include OFDM symbols.

12. The PLC device of claim 10, wherein the repeated symbols include one or more of a chirp sequence, a pseudo-random bit sequence, a barker sequence, and an arbitrary +1/−1 sequence.

13. A method, comprising:
performing by a power line communication (PLC) device of a first PLC communication standard type:
determining whether a native preamble for the first PLC communication standard type or a non-native preamble that is not the native preamble for the first PLC communication standard type is detected after a coexistence preamble on a PLC channel;
configuring a preamble indication primitive in a first format if the native preamble for the first PLC communication standard type is detected in addition to the coexistence preamble;
configuring the preamble indication primitive in a second format if the non-native preamble that is not the native preamble for the first PLC communication standard type is detected in addition to the coexistence preamble;
setting a carrier-sensing mechanism based upon the preamble indication primitive; and
sending the preamble indication primitive from a PHY layer to a MAC layer on the PLC device;
wherein the co-existence preamble includes a sequence of symbols that is detectable by both PLC devices of the first PLC communication standard type and PLC devices of a second PLC communication standard type that is different from the first PLC communication standard type;
wherein the native preamble for the first PLC communication standard type is detectable by PLC devices of the first PLC communication standard type but not by PLC devices of the second PLC communication standard type; and
wherein the non-native preamble that is not the native preamble for the first PLC communication standard type is not detectable by PLC devices of the first PLC communication standard type.

14. The method of claim 13, further comprising:
setting the carrier-sensing mechanism to a first interframe spacing value if the native preamble for the first PLC communication standard type is detected in addition to the coexistence preamble; and
setting the carrier-sensing mechanism to a second interframe spacing value if the non-native preamble that is not the native preamble for the first PLC communication standard type is detected in addition to the coexistence preamble.

15. The method of claim 13, further comprising:
setting the carrier-sensing mechanism to a native extended interframe spacing (EIFS) value if the native preamble for the first PLC communication standard type is detected in addition to the coexistence preamble; and
setting the carrier-sensing mechanism to the coexistence extended interframe spacing (cEIFS) if the non-native preamble that is not the native preamble for the first PLC communication standard type is detected in addition to the coexistence preamble.

16. The method of claim 13, wherein the non-native preamble that is not the native preamble for the first PLC communication standard type is the native preamble for the second PLC communication standard that is detectable by PLC devices of the second PLC communication standard type but not by PLC devices of the first PLC communication standard type.

* * * * *